United States Patent

US010707453B2

(12) United States Patent
Fujishima

(10) Patent No.: US 10,707,453 B2
(45) Date of Patent: Jul. 7, 2020

(54) METHOD FOR PRODUCING POUCH BATTERY

(71) Applicant: TOYOTA JIDOSHA KABUSHIKI KAISHA, Toyota-shi, Aichi-ken (JP)

(72) Inventor: Seigo Fujishima, Miyoshi (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 15/955,009

(22) Filed: Apr. 17, 2018

(65) Prior Publication Data
US 2018/0309092 A1 Oct. 25, 2018

(30) Foreign Application Priority Data
Apr. 21, 2017 (JP) ................................. 2017-084325

(51) Int. Cl.
H01M 2/02 (2006.01)
H01M 10/04 (2006.01)

(52) U.S. Cl.
CPC ......... H01M 2/021 (2013.01); H01M 2/0207 (2013.01); H01M 2/0275 (2013.01); H01M 10/0404 (2013.01); H01M 10/0436 (2013.01)

(58) Field of Classification Search
CPC .. H01M 2/021; H01M 2/0207; H01M 2/0275; H01M 10/0404; H01M 10/0436
See application file for complete search history.

(56) References Cited

U.S. PATENT DOCUMENTS 4,756,717 A * 7/1988 Sturgis ................ H01M 6/48
29/623.3
4,912,907 A * 4/1990 Fang ................... B65B 43/465
53/386.1

(Continued)

FOREIGN PATENT DOCUMENTS

JP 2013-077447 A 4/2013

OTHER PUBLICATIONS

General Plastics, "Machinable Foam: Our Rigid Polyurethane Foam Tooling Board", https://www.generalplastics.com/tooling-and-molds.html, Internet Archive capture (Apr. 8, 2016) (Year: 2016).*

Primary Examiner — Michael N Orlando
Assistant Examiner — Christopher W Raimund
(74) Attorney, Agent, or Firm — Sughrue Mion, PLLC

(57) ABSTRACT

[PURPOSE]
To provide a method for producing a pouch battery that can reduce formation of creases on the main sides and the lateral sides of the laminate film exterior body.
[SOLUTION MEANS]
A method for producing a pouch battery that comprises a cell stack insertion step in which a cell stack is inserted in a laminate film exterior body, an outer perimeter edge sealing step in which the outer perimeter edges of the laminate film exterior body in which the cell stack has been inserted are sealed in an airtight chamber in a state of reduced pressure, a tensile force applying step in which tensile force is applied to the outer sides in the in-plane direction at two facing locations in the in-plane direction on the outer perimeter edges of the laminate film exterior body, and a tensile force-maintained air release step, in which application of tensile force to the outer sides of the laminate film exterior (Continued)

body in the in-plane direction is maintained while the pressure in the airtight chamber is raised to atmospheric pressure.

7 Claims, 9 Drawing Sheets

(56) References Cited

U.S. PATENT DOCUMENTS

| | | | | |
|---|---|---|---|---|
| 4,997,732 | A * | 3/1991 | Austin | H01M 2/021 429/153 |
| 5,048,268 | A * | 9/1991 | Brembilla | B65B 31/021 226/173 |
| 2011/0244315 | A1 * | 10/2011 | Yoon | H01M 2/0207 429/176 |
| 2013/0084484 | A1 | 4/2013 | Shinyashiki et al. | |
| 2016/0043402 | A1 * | 2/2016 | Hagiyama | H01M 2/18 429/163 |
| 2017/0317376 | A1 * | 11/2017 | Yoon | H01M 2/1016 |

* cited by examiner (a) PERSPECTIVE VIEW (b) CROSS SECTIONAL VIEW A-A (a) AFTER OUTER PERIMETER EDGE SEALING STEP
(UNDER REDUCED PRESSURE)

(b) AFTER ATMOSPHERE RELEASE STEP (c) AFTER FOLDING THE OUTER PERIMETER EDGES (a) AFTER OUTER PERIMETER EDGE SEALING STEP
    (UNDER REDUCED PRESSURE)

(b) AFTER ATMOSPHERE RELEASE STEP
    (RESULT IN CREASES IN THE MAIN SIDES)

(c) AFTER FOLDING THE OUTER PERIMETER EDGES (a) AFTER OUTER PERIMETER EDGE SEALING STEP
    (UNDER REDUCED PRESSURE)

(b) AFTER ATMOSPHERE RELEASE STEP
    (RESULT IN CREASES IN THE LATERAL SIDES)

(c) AFTER FOLDING THE OUTER PERIMETER EDGES (a) HOLDING THE OUTER PERIMETER EDGES (b) PULLING THE OUTER PERIMETER EDGES (c) MOUNTING PRESSER JIG (d) ATMOSPHERE RELEASE STEP UNDER PRESSER JIG-MOUNTED AND TENSILE FORCE-MAINTAINED (e) RELEASING PRESSER JIG AND HOLDING OF OUTER PERIMETER EDGES

METHOD FOR PRODUCING POUCH BATTERY

TECHNICAL FIELD

The present disclosure relates to a method for producing a pouch battery.

BACKGROUND ART

Pouch batteries are known that have a cell stack encapsulated in a laminate film exterior body.

In a pouch battery, creases generated at portions of the laminate film exterior body that cover the main sides of the cell stack result in uneven constraining pressure being applied to the cell stack when the pouch battery is constrained, producing an adverse effect on the battery performance and especially on the long-term cycle characteristic. Therefore, techniques for minimizing formation of creases in laminated exterior bodies have been proposed.

For example, PTL 1 describes a method for producing a pouch battery comprising:

a forming step in which a laminate film is formed into a cup section that can receive a flat-shaped cell stack, a housing step in which the flat-shaped cell stack is housed into the formed laminate that has been formed in the forming step, and a sealing step in which the opening of the cup section of the formed laminate is covered with a laminated sheet and sealed in a state of reduced pressure, wherein the length of the bottom of the cup section formed in the forming step, in the direction along at least one side, is longer than the length of the cell stack housed in the housing step.

In the pouch battery produced by the method of PTL 1, the bottom of the cup section formed in the laminate film exterior body has a shape protruding outward from the lateral sides of the cell stack, along the main sides of the cell stack, and folded over from the protruding end and connected to the side of the cup section.

CITATION LIST

Patent Literature

[PTL 1] Japanese Unexamined Patent Publication No. 2013-77447

DISCLOSURE OF THE INVENTION

Problems to be Solved by the Invention

With the technology of PTL 1 it is possible to reduce creases at the sections of the laminate film exterior body covering the main sides of the cell stack. However, creases are still inevitably formed on the lateral sides of the laminate film exterior body. The creases on the lateral sides of the laminate film exterior body interfere with folding of the sealed sections (thermocompression bonded sections) of the laminate film exterior body. A pouch battery obtained by the technology of PTL 1 therefore has a significant volume of sections that do not contribute to the cell function, and thus has a drawback in terms of the output per volume.

The present disclosure has been devised for the purpose of solving this problem. It is therefore an object of the disclosure to provide a method for producing a pouch battery that can reduce formation of creases on the main sides and the lateral sides of the laminate film exterior body.

Means for Solving the Problems

The present disclosure is as follows.

[1] A method for producing a pouch battery, the method comprising:

inserting a cell stack in a laminate film exterior body, sealing the outer perimeter edges of the laminate film exterior body in which the cell stack has been inserted, in an airtight chamber in a state of reduced pressure, applying tensile force outward in the in-plane direction at two facing locations in the in-plane direction on the outer perimeter edges of the laminate film exterior body, and raising the pressure in the airtight chamber to atmospheric pressure while maintaining the application of tensile force outward in the in-plane direction of the laminate film exterior body.

[2] The method according to [1], wherein the application of tensile force outward in the in-plane direction of the laminate film exterior body is carried out with spring mechanisms situated between holding devices that are holding the two facing locations in the in-plane direction on the outer perimeter edges of the laminate film exterior body, and tension application devices.

[3] The method according to [1] or [2], wherein a seal head for sealing of the outer perimeter edges of the laminate film exterior body, is also used as the holding devices that hold both ends of the laminate film exterior body for application of tensile force.

[4] The method according to any one of [1] to [3], wherein after application of the tensile force, a presser jig is mounted on the laminate film exterior body in which the cell stack is encapsulated and the pressure inside the airtight chamber is raised.

[5] The method according to [4], wherein the presser jig comprises:

main side pressing units that are able to apply contact pressure to each of the two sides of the laminate film exterior body covering the main sides of the cell stack, from two directions facing in the direction of stacking of the cell stack, and lateral side pressing units that are connected to the main side pressing units in a rotatable manner where the rotation axis is a straight line parallel to the main sides of the laminate film exterior body and perpendicular to the direction of tensile force applied to both ends of the outer perimeter of the laminate film exterior body, and are able to apply contact pressure to each of the two lateral sides of the laminate film exterior body, from two directions facing in the in-plane direction of the cell stack.

[6] The method according to [4], wherein the presser jig has a shape with a recess that engages with the pouch battery.

[7] The method according to any one of [4] to [6], wherein the presser jig is composed of a hard sponge.

Effect of the Invention

According to the disclosure it is possible to provide a method for producing a pouch battery that can reduce formation of creases on the main sides and the lateral sides of the laminate film exterior body. The pouch battery produced by the method of the disclosure has reduced creases on the main sides of the laminate film exterior body, allowing constraining pressure to be evenly applied to the cell stack when the pouch battery has been constrained, and therefore the battery performance is excellent. In addition, since creases in the lateral sides of the laminate film exterior body are also reduced and there is no interference when the sealed sections are folded, it is possible to minimize the volume of the sizes of the portions that do not contribute to cell function, thereby allowing the output per volume to be maximized.

BEST MODE FOR CARRYING OUT THE INVENTION

The method for producing a pouch battery of the disclosure is a method comprising:

inserting a cell stack in a laminate film exterior body, sealing the outer perimeter edges of the laminate film exterior body in which the cell stack has been inserted, in an airtight chamber in a state of reduced pressure, applying tensile force outward in the in-plane direction at two facing locations in the in-plane direction on the outer perimeter edges of the laminate film exterior body, and raising the pressure in the airtight chamber to atmospheric pressure while maintaining the application of tensile force outward in the in-plane direction of the laminate film exterior body.

Throughout the present specification, the term "in-plane direction" refers to the direction in the plane perpendicular to the direction of stacking of the cell stack. Of the sides of the cell stack, the two sides that are perpendicular to the direction of stacking of the cell stack and situated on the outermost layer of the cell stack, may each also be referred to as the "main sides" of the cell stack. Among the sides of the laminate film exterior body, the two sides that cover the main sides of the cell stack may be referred to as the "main sides" of the laminate film exterior body. Among the sides of the laminate film exterior body, the sides perpendicular to the main sides of the laminate film exterior body may be referred to as the "lateral sides" of the laminate film exterior body. The outer perimeter edges of the laminate film exterior body are the edges of the outer perimeter in the in-plane direction of the laminate film exterior body. The length of the pouch battery along the direction of stacking of the cell stack may be referred to as the height of the pouch battery. On the main sides of the pouch battery, the length along the short sides may be referred to as the width of the pouch battery.

Figure 1:
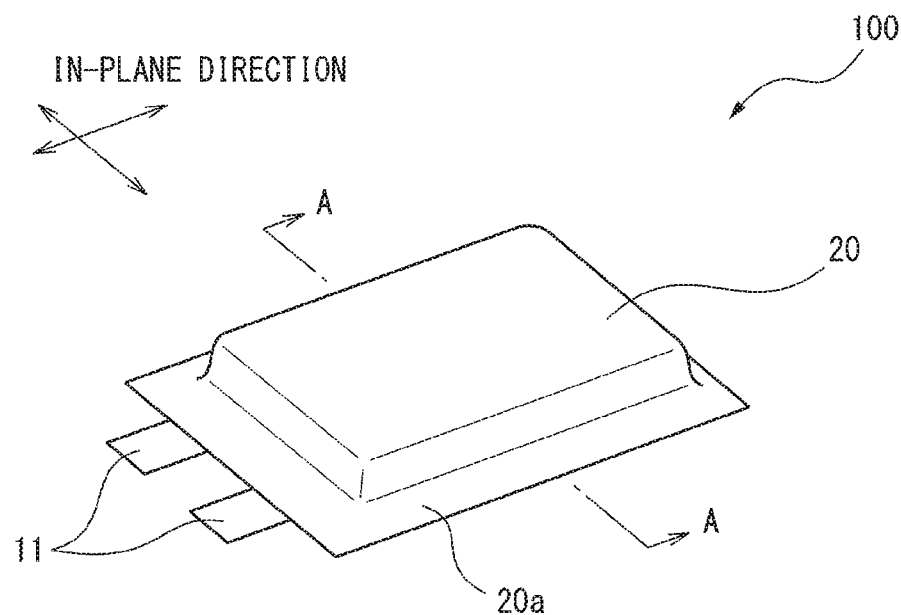
FIG. 1 is a schematic diagram illustrating the structure of a common pouch battery.
Figure 1:
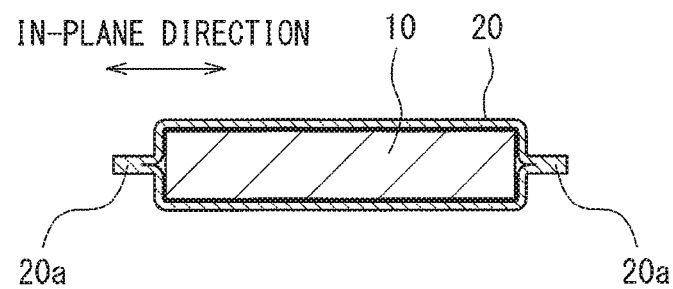

A structure of a common pouch battery is shown in FIG. 1. The pouch battery 100 of FIG. 1 has a cell stack 10 encapsulated in a laminate film exterior body 20. The outer perimeter edges 20a of the laminate film exterior body 20 are sealed by thermocompression bonding, for example. However, the collecting members 11 of the positive and negative electrodes are exposed to the outside, allowing external extraction and use of electric power. In the pouch battery shown in FIG. 1, the collecting members of the positive and negative electrodes protrude to the outside in the in-plane direction from the same side. However, the positive electrode collector member and negative electrode collector member may instead protrude out from two mutually opposite sides.

Figure 2:
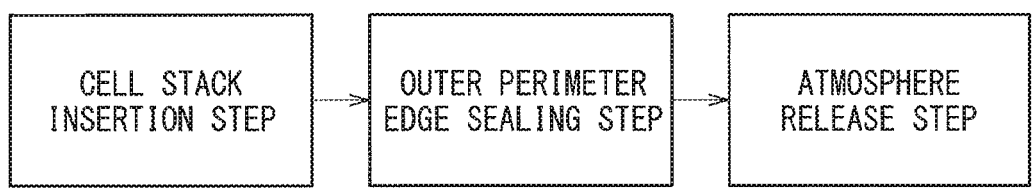
FIG. 2 is a flow chart showing an overview of a method for producing a pouch battery according to the prior art.

An overview of a method for producing a pouch battery according to the prior art is shown in FIG. 2.

The method for producing a pouch battery according to the prior art shown in FIG. 2 comprises:

a cell stack insertion step in which a cell stack is inserted into a laminate film exterior body, an outer perimeter edge sealing step in which the outer perimeter edges of the laminate film exterior body are sealed in an airtight chamber in a state of reduced pressure, and an air release step in which the pressure in the airtight chamber is raised to atmospheric pressure.

In this method, the cup section that is to engage with the inserted cell stack is first formed by embossing of the laminate film exterior body, and the electrode stack and laminate film exterior body are closely fitted, reducing the volume of the pouch battery. After the air release step, the outer perimeter edges 20a of the laminate film exterior body 20 where the collectors are not exposed are folded to minimize the volume of the pouch battery.

Figure 3:
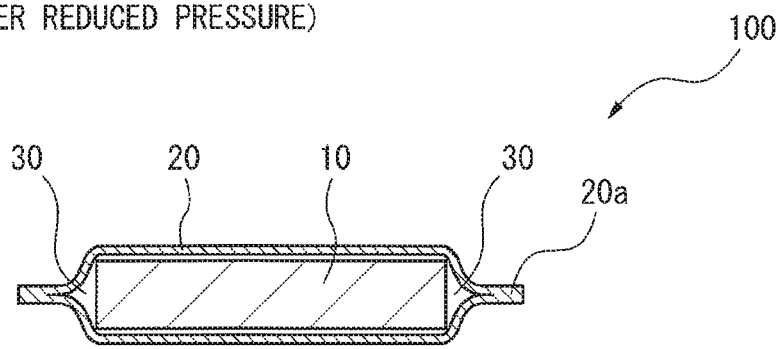
FIG. 3 is a simplified cross-sectional view showing an overview of a method for producing a pouch battery according to the prior art.
Figure 3:
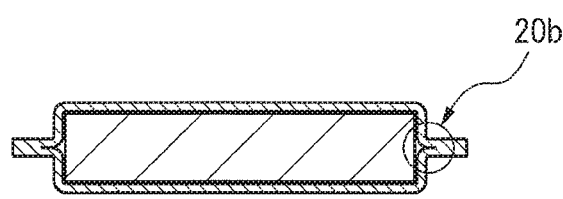
Figure 3:

The condition of the pouch battery from completion of the outer perimeter edge sealing step until after the outer perimeter edges have been folded, in the method described in FIG. 2, is illustrated in FIG. 3 as a simplified cross-sectional view. FIG. 3 shows a cross-section in the same direction as the cross-sectional view A-A in FIG. 1(b).

When carrying out the embossing to form the cup section of the laminate film exterior body 20, it is necessary to provide a fixed gap between the male and female members in order to prevent tearing of the laminate or rupture of the metal foil in the laminate film. When the cell stack 10 is inserted in the laminate film exterior body 20, a fixed insertion gap must also be provided between them. For these reasons, the cup section of the laminate film exterior body 20 is formed larger than the cell stack 10. Thus, after the outer perimeter edge sealing step in which the outer perimeter edges of the laminate film exterior body 20 in which the cell stack 10 has been inserted are sealed in an airtight chamber in a state of reduced pressure, and before the air release, spaces 30 will be present between both ends of the cell stack 10 in the in-plane direction and the laminate film exterior body 20 (FIG. 3(a)). The presence of the spaces 30 causes excess laminate 20b to be generated after the air release step in which the pressure in the airtight chamber is increased (FIG. 3(b)). The excess laminate 20b on the outer perimeter edges where the collecting members are not protruding is bent with the outer perimeter edge 20a, for the purpose of minimizing the volume of the pouch battery 100.

When the air release step is carried out with spaces 30 present between the cell stack 10 and the laminate film exterior body 20 in a state of reduced pressure, creases are sometimes formed in the laminate film exterior body 20. It is not possible to manage where the creases will be formed in the laminate film exterior body 20.

Figure 4:
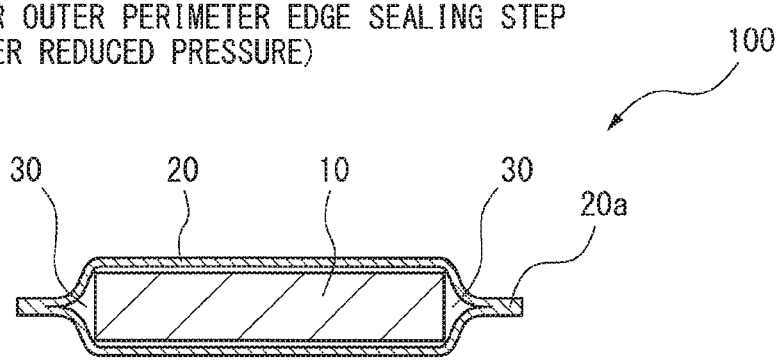
FIG. 4 is a simplified cross-sectional view illustrating the state of creases formed in the main sides of a laminate film exterior body in a pouch battery of prior art.
Figure 4:
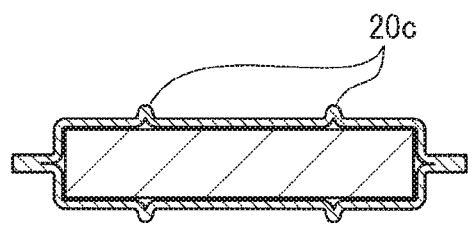
Figure 4:
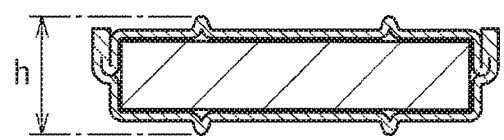

The state of creases formed in the main sides of a laminate film exterior body in a pouch battery of prior art is shown in FIG. 4, which is a simplified cross-sectional view. FIG. 4 shows a cross-section in the same direction as the cross-sectional view A-A in FIG. 1(b).

The spaces 30 produced in the pouch battery 100 before the air release step (FIG. 4(a)) sometimes result in creases 20c in the main sides of the laminate film exterior body 20, after the air release step (FIG. 4(b)). The creases 20c increase the height h of the pouch battery 100 after folding of the outer perimeter edge, and present an obstacle against minimizing the volume (FIG. 4(c)).

Figure 5:
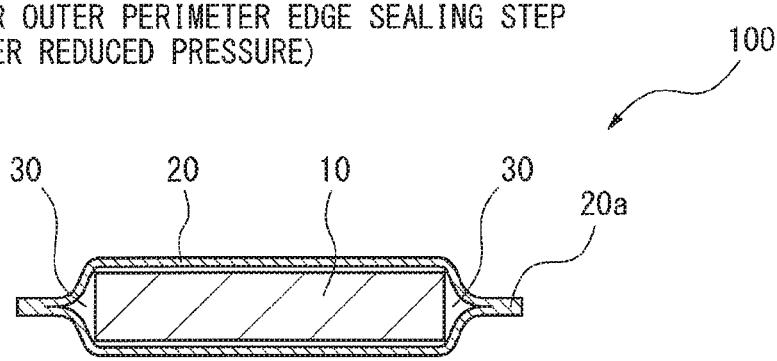
FIG. 5 is a simplified cross-sectional view illustrating the state of creases formed in the lateral sides of a laminate film exterior body in a pouch battery of prior art.
Figure 5:
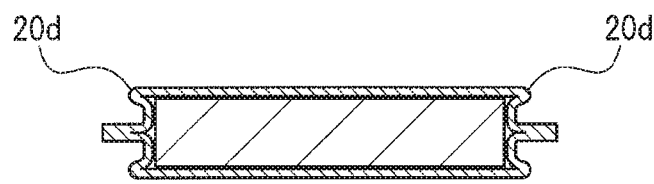
Figure 5:
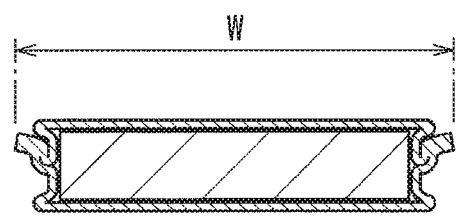

The state of creases formed in the lateral sides in a pouch battery of prior art is shown in FIG. 5, which is a simplified cross-sectional view. FIG. 5 shows a cross-section in the same direction as the cross-sectional view A-A in FIG. 1(b).

The spaces 30 produced in the pouch battery 100 before the air release step (FIG. 5(a)) sometimes result in creases 20d in the lateral sides of the pouch battery 100, after the air release step (FIG. 5(b)). The creases 20d increase the width w of the pouch battery 100 after folding of the outer perimeter edges, and present an obstacle against minimizing the volume (FIG. 5(c)).

In the method for producing a pouch battery according to the disclosure, after the outer perimeter edges of the laminate film exterior body in which the cell stack has been inserted are sealed under reduced pressure, the reduced pressure is terminated and the air is released while applying tensile force in the in-plane direction to the outer sides at two facing locations in the in-plane direction on the outer perimeter edges of the laminate film exterior body, thereby reducing formation of creases in the laminate film exterior body.

The method for producing a pouch battery according to the present disclosure will now be explained with an illustrative embodiment of the present disclosure (hereunder referred to as "the present embodiment"), with reference to the accompanying drawings as necessary.

<Method for Producing a Pouch Battery>

Figure 6:
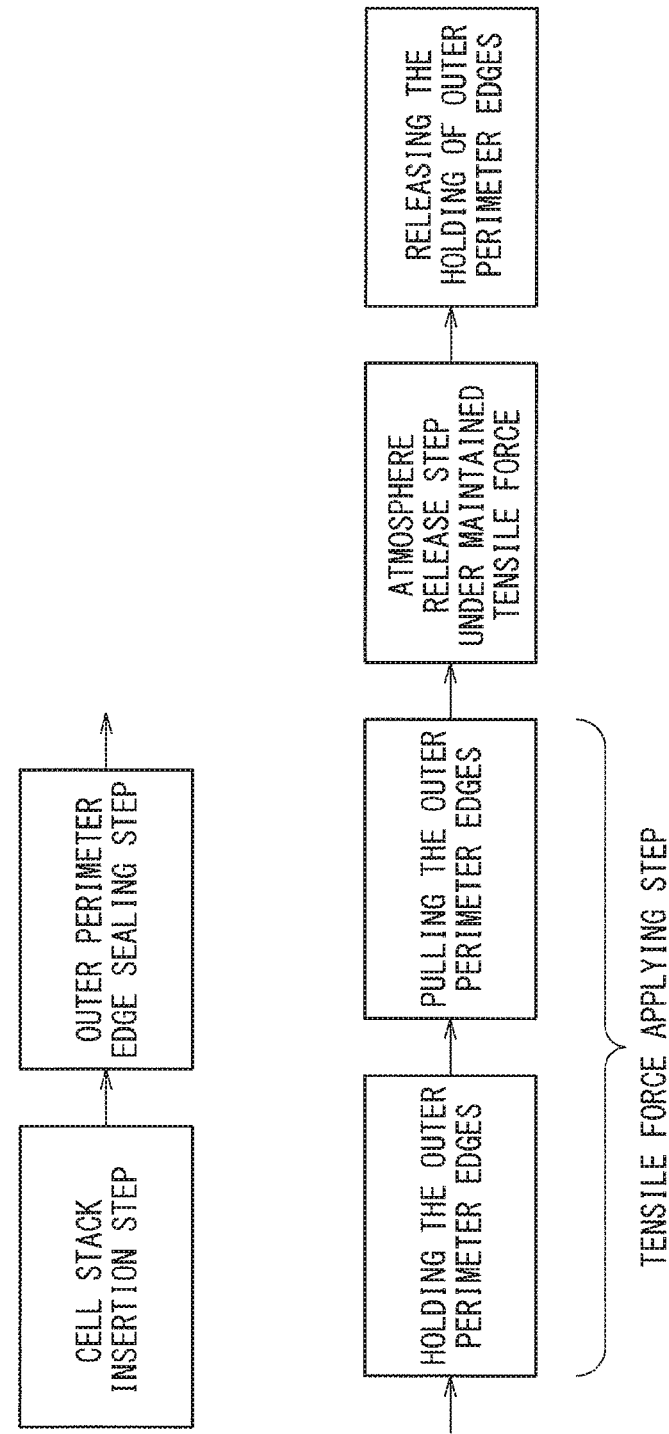
FIG. 6 is a flow chart showing an overview of a method for producing a pouch battery according to the disclosure.

FIG. 6 shows an overview of a method for producing a pouch battery according to the disclosure.

The method for producing a pouch battery according to the present embodiment illustrated in FIG. 6 is a method comprising:

a cell stack insertion step in which a cell stack is inserted in a laminate film exterior body, an outer perimeter edge sealing step in which the outer perimeter edges of the laminate film exterior body in which the cell stack has been inserted are sealed in an airtight chamber in a state of reduced pressure, a tensile force applying step in which tensile force is applied to the outer side in the in-plane direction at two facing locations in the in-plane direction on the outer perimeter edges of the laminate film exterior body, and a tensile force-maintained air release step, in which application of tensile force to the outer side of the laminate film exterior body in the in-plane direction is maintained while the pressure in the airtight chamber is raised to atmospheric pressure.

The tensile force applying step includes holding two facing locations on the outer perimeter edges of the laminate film exterior body in the in-plane direction, and pulling the held sections of the outer perimeter edges toward the outer side in the in-plane direction. After the tensile force-maintained air release step, holding of the outer perimeter edges of the laminate film exterior body may be released.

Figure 7:
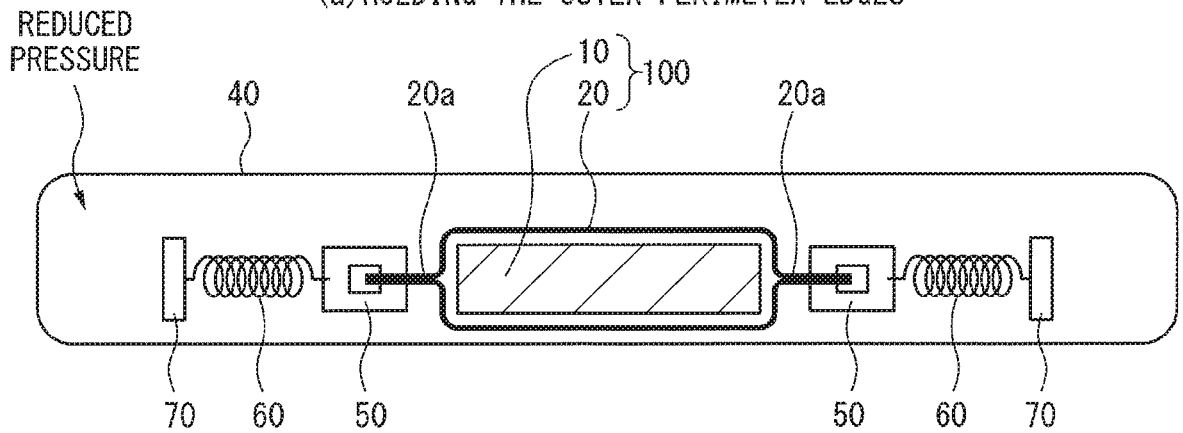
FIG. 7 is a diagram showing an example of a specific embodiment of a method for producing a pouch battery according to the disclosure, from holding of the outer perimeter edges until release of holding.
Figure 7:
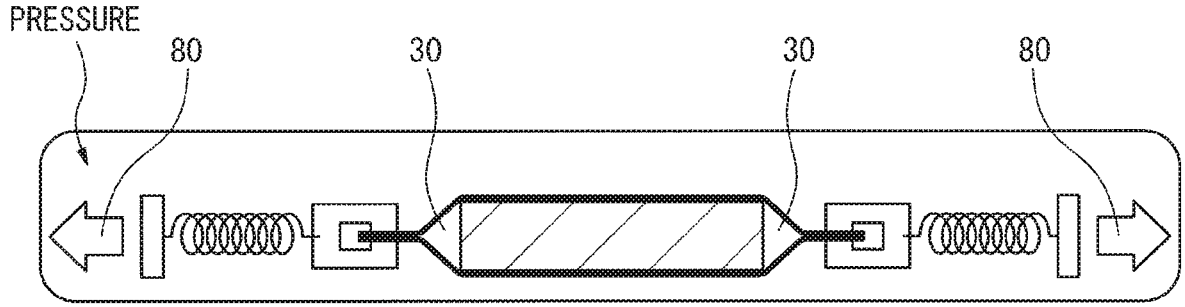
Figure 7:
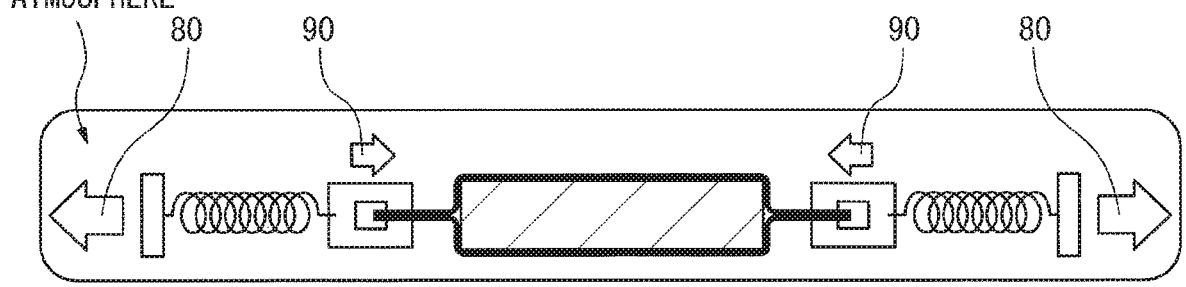
Figure 7:
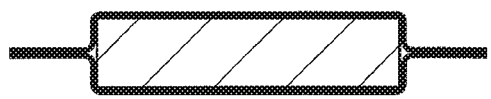

FIG. 7 shows an example of a concrete embodiment, from holding of the outer perimeter edges of the tensile force applying step until release of holding of the outer perimeter edges after the tensile force-maintained air release step. The cross-section of the pouch battery 100 shown in FIG. 7 is a cross-section in the same direction as the cross-sectional view on line A-A shown in FIG. 1(b).

[Cell Stack Insertion Step]

The cell stack insertion step is a step of inserting the cell stack into the laminate film exterior body.

The laminate film exterior body may be an exterior body composed of, for example, a resin-laminated metal foil having a resin film on one or both sides of a metal foil. A typical example is an exterior body composed of a resin-laminated metal foil comprising a resin film laminated on one side of a metal foil in order to impart mechanical strength, and a resin film with a heat sealing property laminated on the opposite side.

The metal foil of the resin-laminated metal foil may be a foil composed of aluminum or aluminum alloy, for example. The resin film serving to maintain mechanical strength may be a film made of polyester or nylon, for example. The resin film with a heat sealing property may be a film made of a polyolefin, for example, and specifically a polyethylene or polypropylene film.

The cell stack may be, for example, a stack comprising one or more unit cells having a negative electrode collector layer, negative electrode active material layer, solid electrolyte layer, positive electrode active material layer and positive electrode collector layer, stacked in that order. When the cell stack comprises a plurality of unit cells, the unit cells that are adjacent in the direction of stacking may have a construction in which they share a positive electrode collector layer or negative electrode collector layer. The cell stack may be in the following stacking order as an example: negative electrode collector layer, negative electrode active material layer, solid electrolyte layer, positive electrode active material layer, positive electrode collector layer, positive electrode active material layer, solid electrolyte layer, negative electrode active material layer, negative electrode collector layer, wherein two unit cells sharing the positive electrode collector layer are stacked adjacent with the layers in reverse order.

When the cell stack has a plurality of negative electrode collector layers, the negative electrode collecting members may be formed with electrical conduction between the plurality of negative electrode collector layers, and allowing connection with the exterior. When the cell stack has a plurality of positive electrode collector layers, the positive electrode collecting members may be formed with electrical conduction between the plurality of positive electrode collector layers, and allowing connection with the exterior.

The insertion of the cell stack in the laminate film exterior body may be, for example, by:

a method of forming the laminate film exterior body into a bag shape with at least a portion of it as an opening, and inserting the cell stack into the laminate film exterior body through the opening, or a method of setting the cell stack on a sheet-like laminate film exterior body and covering the set cell stack with another sheet-like laminate film exterior body, thereby sandwiching the cell stack between the two sheet-like laminated exterior bodies.

The collecting members of the positive and negative electrodes in the cell stack may be exposed to the exterior through the opening of the laminate film exterior body to allow extraction and use of electric power to the outside. The collecting members may be exposed by exposing both collecting members from one side of the exterior body, or by exposing the positive electrode collector member from one side of the exterior body and the negative electrode collector member from the other side opposite that side.

Another preferred mode of the present embodiment is to first form the cup section that is to engage with the inserted cell stack, by embossing of the laminate film exterior body, and to closely fit the electrode stack and the laminate film exterior body.

[Outer Perimeter Edge Sealing Step]

The outer perimeter edges of the laminate film exterior body in which the cell stack has been inserted are then sealed in an airtight chamber in a state of reduced pressure, to encapsulate the cell stack in the laminate film exterior body.

During the outer perimeter edge sealing step:

the laminate film exterior body in which the cell stack has been inserted may be carried into an airtight chamber and the pressure inside the airtight chamber reduced, the cell stack may be inserted into the laminate film exterior body in the airtight chamber, and then the pressure inside the airtight chamber reduced, or the cell stack and laminate film exterior body may be carried into the airtight chamber, the pressure inside the airtight chamber reduced, and then the cell stack inserted into the laminate film exterior body.

The airtight chamber may be a large vacuum chamber of a type commonly used for production of secondary batteries. The degree of pressure reduction may be as desired, the pressure being 11.6 KPa or lower or 4.0 KPa or lower, for example.

When the laminate film exterior body having an opening has been cast into a bag shape, sealing of the outer perimeter edges of the laminate film exterior body may be accomplished by sealing the opening. When the cell stack has been sandwiched between two sheet-like laminated exterior bodies, the edges around the entire periphery of the two laminated outer perimeter edges may be sealed. For the sealing, the collecting members of the positive and negative electrodes may be exposed to the outside, allowing external extraction and use of electric power.

The sealing may be carried out by heat welding with a seal head, for example.

[Tensile Force Applying Step]

The tensile force applying step includes holding of the outer perimeter edges of the laminate film exterior body and tension of the outer perimeter edges. These are carried out while maintaining a state of reduced pressure in the pressure reduction chamber.

(Holding of Outer Perimeter Edges)

As mentioned above, after the outer perimeter edges of the laminate film exterior body have been sealed under reduced pressure, excess laminate can potentially be generated when the air is released. The outer perimeter edges of the laminate at the sections where the excess laminate is desired to be gathered are held with appropriate holding devices. The holding locations may be two locations on the outer perimeter edges of the laminate film exterior body that are facing in the in-plane direction. The holding locations may be selected so that the directions in which tensile force is applied are orthogonal to the directions in which the collecting members of the positive and negative electrodes protrude.

FIG. 7(a) shows the state after the outer perimeter edges of the laminate film exterior body 20 in which the cell stack 10 has been inserted have been sealed in the airtight chamber 40 under reduced pressure, and two locations on the outer perimeter edges 20a of the laminate film exterior body 20 that are facing in the in-plane direction are held by holding devices 50. The holding devices 50 are connected to the tension application devices 70 via spring mechanisms 60. The spring mechanisms 60 are preferably situated between the holding devices 50 and the tension application devices 70, since this will allow the holding devices 50 to easily move following contraction of the spaces 30 when the pressure in the airtight chamber 40 is raised during the subsequent air release, thereby allowing stress on the pouch battery 100 to be relaxed.

The holding devices 50 may each be a chuck apparatus such as a pneumatic chuck, or a clamp, for example. The holding force by the holding devices may be any level that can withstand the later tension and that allows holding to be continued at the outer perimeter edges of the laminate film exterior body until the subsequent air release, and it may be appropriately set by a person skilled in the art.

Combining the use of the holding devices that hold the outer perimeter edge and the seal head for heat welding in the sealing step is a preferred mode of the present embodiment. Such a construction will allow the apparatus to be simplified. For the present embodiment, at least some of the sections of the laminate film exterior body where the tensile force is applied and the sections that are heat welded are the same locations, and therefore the holding devices can be also used as the seal head.

The tension application devices 70 may have a known construction, such as a tension apparatus comprising a tensile force control mechanism and a tension motor.

(Tension on Outer Perimeter Edges)

FIG. 7(b) shows the state where the outer perimeter edges 20a of the laminate film exterior body 20 are being pulled.

The outer perimeter edges 20a of the laminate film exterior body 20 held by the holding devices 50 are pulled outward in the in-plane direction, applying tensile force 80 to the laminate film exterior body 20 outward in the in-plane direction. The application of tensile force 80 may be carried out with the tension application devices 70 described above.

The tensile force 80 may be a strength such that creases are not generated in the laminate film exterior body 20 after air release, and may be any strength so long as this condition is met. From the viewpoint of effectively reducing generation of creases, the tensile force 80 may be 0.1 (N/10 mm width) or greater, 0.5 (N/10 mm width) or greater, or 1.0 (N/10 mm width) or greater, and from the viewpoint of avoiding excessive stress on the laminate film exterior body 20, it may be 1,000 (N/10 mm width) or lower, 100 (N/10 mm width) or lower or 10 (N/10 mm width) or lower.

Due to the tension on the outer perimeter edges, spaces 30 are formed between the laminate film exterior body 20 and both ends of the cell stack 10 in the in-plane direction.

[Tensile Force-Maintained Air Release Step]

FIG. 7(c) shows the state where the pressure in the airtight chamber 40 has been raised while maintaining the tensile force 80, and the pouch battery 100 is restored to atmospheric pressure.

When the pressure in the airtight chamber 40 is raised, the spaces 30 that are in a state of reduced pressure contract. As this occurs, the two holding devices 50 move in the respective directions indicated by the arrows 90 (FIG. 7(c)). However, since the holding devices 50 of the present embodiment are connected to the tension application devices 70 through the spring mechanisms 60, they can easily move in a manner following contraction of the spaces 30.

Furthermore, since application of the tensile force 80 is maintained while the pressure inside the airtight chamber 40 is being raised, generation of creases that occur with contraction of the spaces 30 is reduced.

[Release of Holding of Outer Perimeter Edge Sections]

Holding of the outer perimeter edges 20a of the laminate film exterior body 20 is then released, to obtain a pouch battery with reduced formation of creases (FIG. 7(d)).

Next, the sides on the outer perimeter edges of the laminate film exterior body where the collectors of the positive and negative electrodes are not exposed may be folded, in order to reduce the volume of the pouch battery to a minimum.

[Battery Presser Jig]

After the tensile force applying step in the method for producing a pouch battery of the present embodiment, a suitable presser jig may be mounted on the laminate film exterior body in which the cell stack has been encapsulated, and then the tensile force-maintained air release step may be carried out.

The presser jig maintains close fitting between the inner surface of the laminate film exterior body and the surface of the cell stack when the pressure inside the airtight chamber is raised from the state of reduced pressure to atmospheric pressure, thereby having the function of more reliably reducing formation of creases in the laminate film exterior body.

Figure 8:
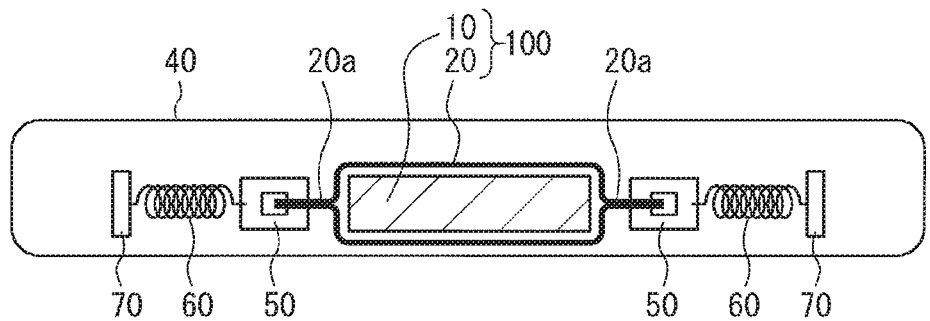
FIG. 8 is a diagram showing an example of an embodiment of a method for producing a pouch battery according to the disclosure, which uses a presser jig.
Figure 8:
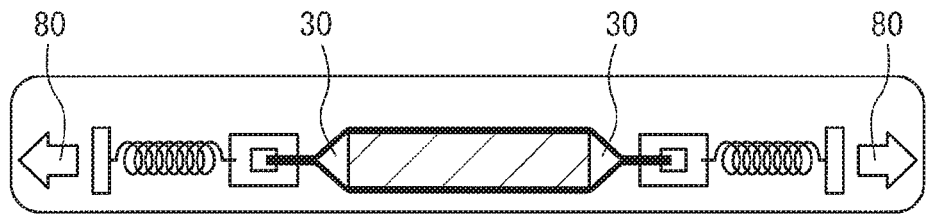
Figure 8:
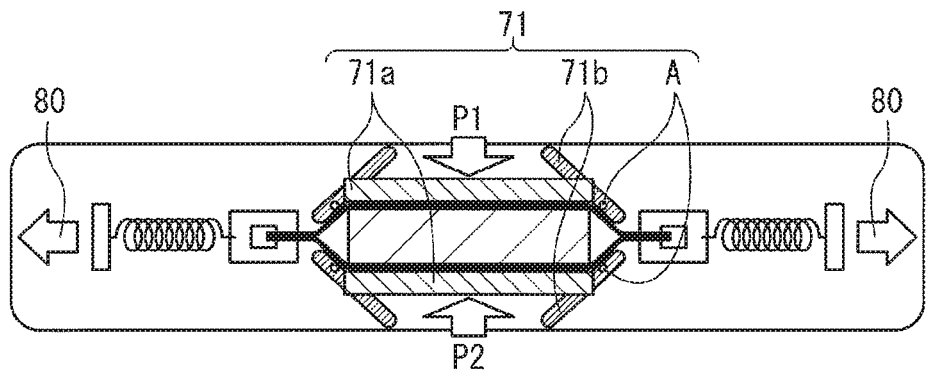
Figure 8:
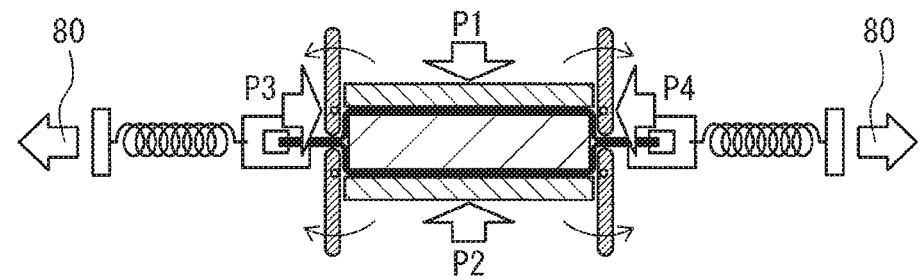
Figure 8:

A specific procedure for using the presser jig is illustrated in FIG. 8.

The method for producing a pouch battery shown in FIG. 8 is a method comprising:

a cell stack insertion step in which a cell stack is inserted in a laminate film exterior body, an outer perimeter edge sealing step in which the outer perimeter edges of the laminate film exterior body in which the cell stack has been inserted are sealed in an airtight chamber in a state of reduced pressure, a tensile force applying step in which tensile force is applied to the outer sides in the in-plane direction at two facing locations in the in-plane direction on the outer perimeter edges of the laminate film exterior body, a presser jig-mounting step in which a presser jig is mounted on the tensile force-applied laminate film exterior body in which the cell stack has been inserted, and a presser jig-mounted and tensile force-maintained air release step, in which the pressure in the airtight chamber is raised to atmospheric pressure with the presser jig mounted on the laminate film exterior body, while maintaining application of tensile force to the outer side of the laminate film exterior body in the in-plane direction.

In this method, the cell stack insertion step, the outer perimeter edge sealing step and the tensile force applying step may be carried out in the same manner as described above (FIGS. 8(a) and (b)).

Next, in the presser jig-mounting step, the presser jig is mounted on the laminate film exterior body in which the cell stack has been encapsulated, while maintaining application of tensile force to the outer side of the laminate film exterior body in the in-plane direction (FIG. 8(c)).

The presser jig 71 mounted in FIG. 8(c) comprises:

main side pressing units 71a that are able to apply contact pressure P1 and P2 to each of the two sides of the laminate film exterior body 20 covering the main sides of the cell stack, from two directions facing in the direction of stacking of the cell stack, and lateral side pressing units 71b that are connected to the main side pressing units 71a in a rotatable manner where the rotation axis A is a straight line parallel to the main sides of the laminate film exterior body and perpendicular to the direction of tensile force 80, and are able to apply contact pressure P3 and P4 to each of the two lateral sides of the laminate film exterior body, from two directions facing in the in-plane direction of the cell stack.

Immediately after the presser jig has been mounted, the tensile force 80 is applied and, since the airtight chamber 40 interior is under reduced pressure, spaces 30 are present between the laminate film exterior body 20 and both ends of the cell stack 10 in the in-plane direction. Therefore, the lateral side pressing units 71b of the presser jig 71 are pressed upward by the laminate film exterior body 20 that has swelled along the shape of the spaces 30, and is in an oblique state.

Next, the pressure inside the airtight chamber is raised for air release, while the presser jig is mounted and while the application of tensile force 80 to both ends of the outer periphery of the laminate film exterior body is maintained (FIG. 8(d)).

When the pressure in the airtight chamber 40 is raised, the spaces 30 that are in a state of reduced pressure contract. As this occurs, the lateral side pressing units 71b of the presser jig 71 rotate around the rotation axis A as the center and contact with both lateral sides of the laminate film exterior body, and contact pressure P3 and P4 is applied to the lateral sides from the two facing directions.

In the presser jig-mounted and tensile force-maintained air release step, the main side pressing units 71a and lateral side pressing units 71b of the presser jig 71 may be pressed. However, since these units are pressed in directions toward close fitting with the laminate film exterior body by air being introduced into the airtight chamber, the desired function is exhibited even without pressing.

The main side pressing units 71a and lateral side pressing units 71b of the presser jig 71 are preferably each made of materials that can maintain approximately equal volume regardless of variation in pressure inside the airtight chamber. For example, they may be made of hard sponges.

By then releasing the presser jig 71 and holding of the outer perimeter edges, it is possible to obtain the desired pouch battery with very minimal formation of creases (FIG. 8(e)).

If the laminate film exterior body is made of a relatively soft material, a presser jig with a more simplified shape may be used instead of the presser jig 71 described above. In such cases, a presser jig 72 such as shown in FIG. 9 may be used, as an example.

Figure 9:
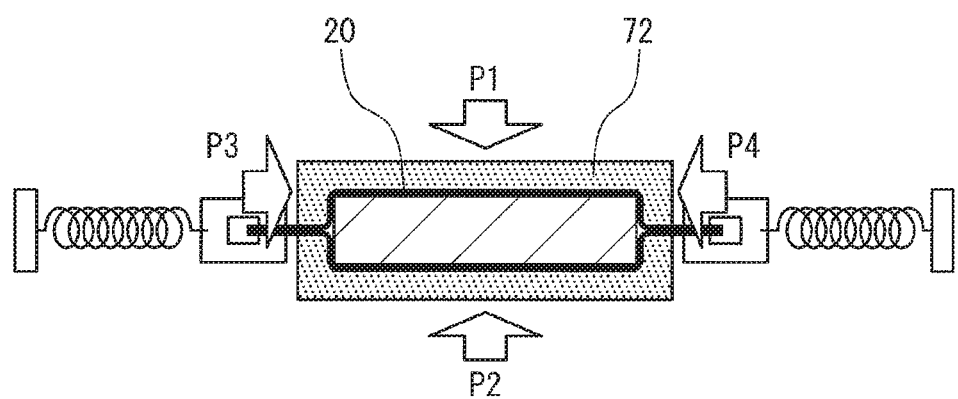
FIG. 9 is a diagram showing another example of a presser jig.

The presser jig 72 in FIG. 9 has a shape with a recess that engages with the desired pouch battery, or a shape with a recess that is analogous to but somewhat smaller than the desired pouch battery. When the laminate film exterior body is made of a relatively soft material, using such a presser jig 72 still allows contact pressure P1 and P2 to be applied to the two main sides of the laminate film exterior body, and allows contact pressure P3 and P4 to be applied to the two lateral sides of the laminate film exterior body.

The presser jig 72 is preferably made of a material that can maintain approximately equal volume regardless of variation in pressure inside the airtight chamber. For example, it may be made of a hard sponge.

EXPLANATION OF SYMBOLS

10 Cell stack
11 Collecting member
20 Laminate film exterior body
20a Outer perimeter edge
20b Excess laminate
20c Crease in main side
20d Crease in lateral side
30 Space
40 Airtight chamber
50 Holding device
60 Spring mechanism
70 Tension application device
71 Presser jig
71a Main side pressing unit
71b Lateral side pressing unit
72 Presser jig
80 Tensile force
90 Movement with contraction of space 30
100 Pouch battery
A Rotation axis
h Height of pouch battery
w Width of pouch battery

What is claimed is:

1. A method for producing a pouch battery, the method comprising
    inserting a cell stack in a laminate film exterior body,
    sealing the outer perimeter edges of the laminate film exterior body in which the cell stack has been inserted, in an airtight chamber in a state of reduced pressure,
    applying tensile force outward in the in-plane direction at two facing locations in the in-plane direction on the outer perimeter edges of the laminate film exterior body by using holding devices that hold the two facing locations in the in-plane direction on, the outer perimeter edges of the laminate film exterior body, thereby forming spaces between the laminate film exterior body and both ends of the cell stack in the in-plane direction, and
    raising the pressure in the airtight chamber to atmospheric pressure, so that the spaces contract, while maintaining the application of tensile force outward in the in-plane direction of the laminate film exterior body, wherein during the raising the pressure, the holding devices move inward in the in-plane direction due to contraction of the spaces caused by the raising the pressure in the airtight chamber.

2. The method according to claim 1, wherein the application of tensile force outward in the in-plane direction of the laminate film exterior body is carried out with spring mechanisms situated between holding devices that are holding the two facing locations in the in-plane direction on the outer perimeter edges of the laminate film exterior body, and tension application devices.

3. The method according to claim 1, wherein a seal head for sealing of the outer perimeter edges of the laminate film exterior body, is also used as the holding devices that hold both ends of the laminate film exterior body for application of tensile force.

4. The method according to claim 1, wherein after application of the tensile force, a presser jig is mounted on the laminate film exterior body in which the cell stack is encapsulated, and the pressure inside the airtight chamber is raised.

5. The method according to claim 4, wherein the presser jig comprises:
    main side pressing units that are able to apply contact pressure to each of the two sides of the laminate film exterior body covering the main sides of the cell stack, from two directions facing in the direction of stacking of the cell stack, and
    lateral side pressing units that are connected to the main side pressing units in a rotatable manner where the rotation axis is a straight line parallel to the main sides of the laminate film exterior body and perpendicular to the direction of tensile force applied to both ends of the outer perimeter of the laminate film exterior body, and are able to apply contact pressure to each of the two lateral sides of the laminate film exterior body, from two directions facing in the in-plane direction of the cell stack.

6. The method according to claim 4, wherein the presser jig has a shape with a recess that engages with the pouch battery.

7. The method according to claim 4, wherein the presser jig is composed of a hard sponge.

* * * * *